UNITED STATES PATENT OFFICE.

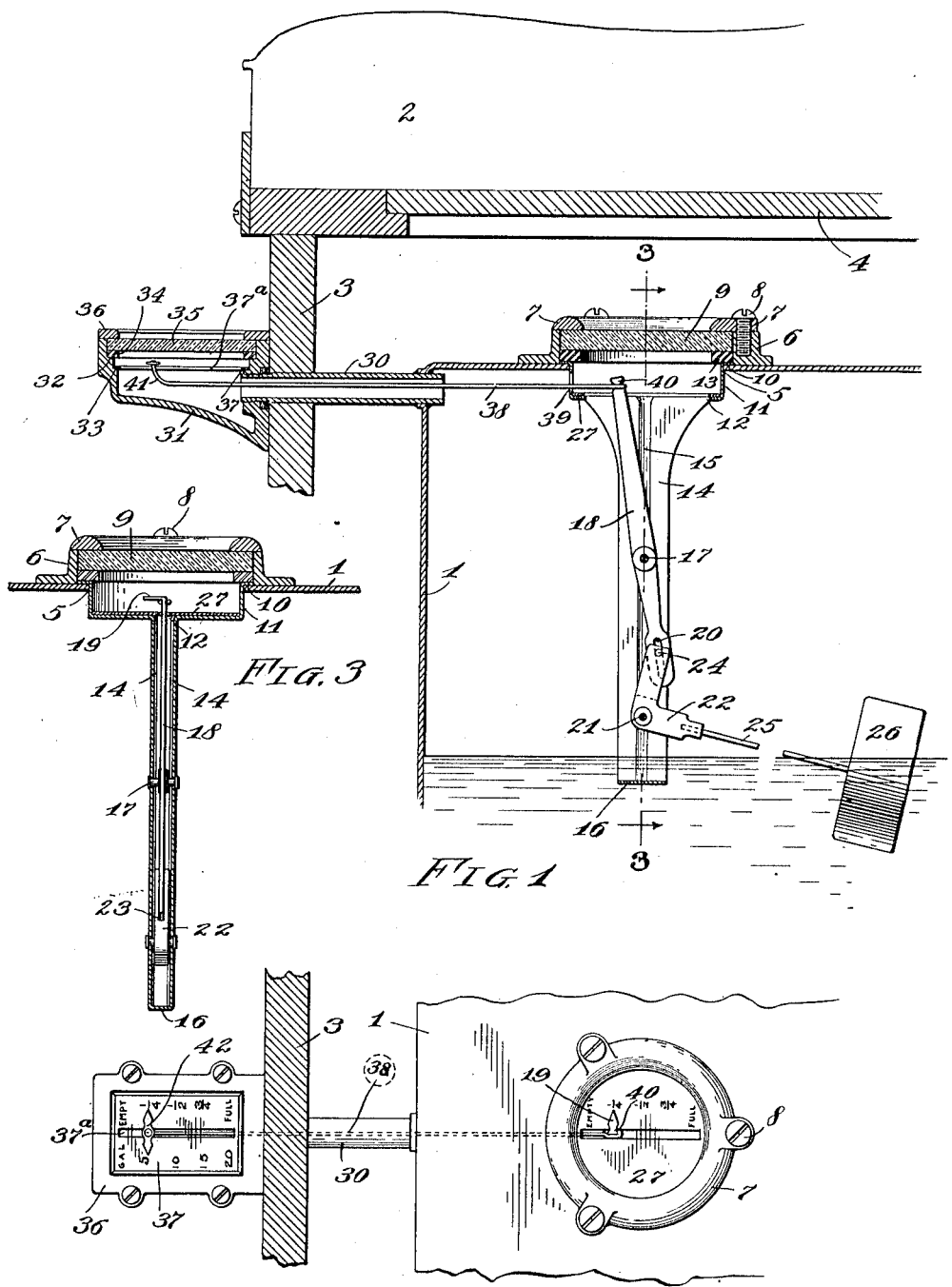

WILLIAM F. WARDEN, OF AKRON, OHIO, ASSIGNOR TO PERRY E. TANNER, OF AKRON, OHIO.

TANK-GAGE.

1,020,785.

Specification of Letters Patent.

Patented Mar. 19, 1912.

Application filed May 5, 1911. Serial No. 625,263.

*To all whom it may concern:*

Be it known that I, WILLIAM F. WARDEN, a citizen of the United States, residing at Akron, in the county of Summit and State of Ohio, have invented a certain new and useful Improvement in Tank-Gages, of which the following is a full, clear, and exact description, reference being had to the accompanying drawings.

This invention relates to gages for liquid containing tanks and has particular reference to a gage adapted for use with the fluid fuel containing tank of an automobile.

According to the construction most favored at the present time the gasolene tank is placed beneath the front seat of a machine and is mounted as high as possible both for the sake of utilizing the space to the fullest possible extent and to increase the pressure or "head" of the liquid. Owing to the comparatively inaccessible location of this tank it is inconvenient to estimate the height of fluid therein by removing the cap and inserting a stick according to the custom of the earlier days, and some sort of gage is necessary, arranged as to be visible from the front.

The object of this invention is the provision of a gage which shall possess extreme simplicity and which shall permit the condition of the gasolene supply to be instantly and conveniently read without the necessity of assuming an awkward or inconvenient position, and in fact without leaving the seat of the machine.

Generally speaking, my invention may be defined as consisting of the combinations of elements recited in the claims hereto annexed and illustrated in the drawings accompanying and forming a part of this application, wherein:

Figure 1 represents a vertical cross sectional view taken through my complete tank gage and illustrating a portion of the tank and of the automobile seat; Fig. 2 is a top plan view of a portion of a tank equipped with my gage, the seat being removed; and Fig. 3 is a transverse cross sectional view taken along the broken line 3—3 of Fig. 1.

Describing the parts by reference characters, 1 indicates a portion of a fuel tank and 2 the seat cushion of an automobile beneath which said tank is concealed.

At 3 is shown a vertical board which forms the front of the seat and at 4 a removable board or lid which supports the seat cushion 2.

Formed in the top of the tank 1 is a circular aperture 5 about which is secured an annular flange 6 provided with a crystal-retaining ring 7 conveniently secured in place by screws 8 and clamping in place a glass crystal 9. Between the edge of said aperture and the interior of the flange is an annular ledge 10 which supports the outturned rim of a shallow cup 11, the bottom of which is formed with a diametrical slot 12. Between the upper face of this rim and the lower face of the crystal a packing gasket 13 is placed so as to prevent leakage of air from the tank in case a pressure feed be employed. Secured to the bottom of this cup are a pair of downwardly extending parallel brackets 14 spaced one on each side of the slot 12 and preferably having reinforcing stiffening corrugations 15 pressed or rolled therein. The lower ends of these brackets are preferably connected by means of a plate 16 and about midway of their length is secured the pivot pin 17. Pivoted upon this pin is the lever 18 having its upper end projecting through the slot 12 and there bent to one side to form a pointer 19. The lower end of this lever is provided with an elongated slot 20. Secured in the brackets 14 beyond the lower end of this lever is a second pivot pin 21 upon which is hung the bell-crank lever 22, the upper arm of which is slotted, as at 23, so as to receive the lower end of lever 18, as shown in Fig. 3. A pin or rivet 24 projects through the side walls of this slot and through the slot 20. To the other arm of the lever 22 is secured the stem 25 of a float 26. Mounted in the cup 11 is a dial plate 27 having marked thereon suitable indicating characters, as shown in Fig. 2, adapted to coöperate with the pointer 19 in indicating the condition of the tank. In the present embodiment the pin 21 is illustrated as disposed substantially at the surface of the liquid when the tank is half full, at which time the stem 25 would be horizontal and the lever 18 vertical. Obviously, however, this arrangement is not essential to my invention as the same condition could be obtained with tanks of different size or brackets of different length by properly arranging the arms of the bell crank lever or by bending the stem 25.

Secured to the upper portion of the side wall of the tank and extending through the board 3 is a horizontal tube 30 to the outer end of which is attached an extension fitting 31. This fitting is made in the form of an oblong hollow casting having one side perforated to receive the tube 30 and having a horizontal open top and a pair of stepped internal ledges 32 and 33, respectively. Mounted on the ledge 32 is a packing gasket 34 upon which is supported a transparent crystal 35 held in place by a frame 36. Mounted upon the ledge 33 is a dial plate 37 having therein an elongated slot 37ª parallel to and preferably in alinement with the tube 30. A tracker wire 38 extends through this tube and through a perforation 39 in the cup 11 to a loose connection with the upper end of the lever 18, such connection being shown as effected by looping the end of this wire about a reduced portion 40 of the lever. The outer end of this wire is upturned, as at 41, so as to project through the slot 37ª and is there provided with a pointer 42 adapted to coöperate with suitable indicator figures formed on this dial. These indicator figures can be made to correspond with those on the dial 27 as illustrated herein, or they may be different as convenience may indicate. Furthermore, this extension fitting may be secured either to the front board of the seat or to the side of the automobile outside the end of the seat depending upon the convenience of the maker or the fancy of the buyer. In either case, it is obvious that the upturned face of the dial therein will be immediately and conveniently visible at all times. Obviously, either of these arrangements could be employed separately. The tube 30 and extension fitting 31 might be omitted and the tank dial alone employed, and this course will doubtless be followed in many cases. Conversely, the pointer 19 and dial 27 could be omitted and only the extension fitting be employed. It is also possible to secure the brackets 14 to other portions of the tank than the top and still cause the pointer to be actuated in the same manner by suitably inclining the arms of the levers and by bending the stem of the float.

It will be apparent that many variations in form, size, location, and arrangement of parts and in details of construction can be made without departing from the scope of my invention and all such variations I consider as falling within this invention except as specifically excluded by the terms of the claims annexed hereto or necessarily excluded because of the prior art.

Having thus described my invention, what I claim is:

1. The combination, with a tank, of a supporting member therewith and secured to one of the walls thereof, a lever pivoted to said supporting member, a bell-crank lever pivoted to said supporting member upon an axis parallel to the axis of said first lever and having one of its arms operatively connected to an arm of said first lever, a float secured to the other arm of said bell-crank lever and adapted to move the same upon changes in the level of liquid in said tank, a dial, and a pointer operatively connected with said first lever and coöperating with said dial.

2. The combination, with a tank, of a cup-shaped member therewithin and secured to one of the walls thereof and having a slot in its bottom portion, a supporting member carried by said cup-shaped member and projecting into the tank, a lever pivoted to said supporting member and having its outer end projecting through said slot, the inner end of said lever being slotted; a second lever pivoted to said supporting member and having a pin in one of its arms engaging in the slot of said first lever, a float secured to the other arm of said second lever and adapted to move the same upon changes of the level of liquid in said tank, a dial in said cup adjacent to said slot, and a pointer carried by the outer end of said first lever and coöperating with said dial.

3. The combination, with a tank, of a supporting member therewithin and secured to one of the walls thereof, a lever pivoted to said supporting member, a bell-crank lever pivoted to said supporting member and having one of its arms operatively connected to an arm of said first lever, a float secured to the other arm of said bell-crank lever and adapted to move the same upon changes of the level of liquid in said tank, a tube extending laterally from said tank, a fitting secured to the outer end of said tube and provided with a dial, a pointer coöperating with said dial, and a connecting member extending through said tube and operatively connecting said lever and said pointer.

4. The combination, with a tank, of a supporting member secured to one of the walls thereof, and projecting inwardly into said tank, a lever pivoted to said supporting member, a bell-crank lever pivoted to said supporting member and having one of its arms articulated to an arm of the said first lever, a float connected to the other arm of said bell-crank lever, a tube secured to the wall of said tank opposite the other end of said first lever and projecting outwardly, a fitting secured to the end of said tube and having a dial and a crystal covering said dial and spaced therefrom, a wire articulated to the end of said first lever and projecting through said tube, and a pointer attached to the outer end of said wire and coöperating with said dial.

5. The combination, with a tank having an aperture in one of its walls, of a cup shaped supporting member secured in said aperture, said member having a slot in its bottom and a bracket projecting inwardly into said tank, a lever pivoted to said bracket and having an end projecting through said slot, a second lever pivoted to said supporting member and having one of its arms operatively connected to an arm of said first lever, a float secured to the other arm of said second lever, a tube secured to the wall of said tank opposite said cup and projecting outwardly, said cup having a perforation in its wall opposite said tube, a fitting secured to the end of said tube and having a dial, and a crystal covering said dial and spaced therefrom, a wire articulated to the end of said first lever and projecting through said perforation and said tube, and a pointer attached to the outer end of said wire and coöperating with said dial.

6. The combination, with a liquid containing tank, having an aperture in one of its walls, and a flange surrounding and spaced from said aperture and defining an annular ledge, of a cup shaped member in said aperture and having a circumferential flange seated on said ledge, said member having a slot in the bottom thereof, a bracket carried by said member and projecting inwardly into said tank, a lever pivoted to said bracket and having one end projecting through said slot, a second lever pivoted to said bracket and operatively connected to said first lever, a float attached to said second lever and adapted to move said first lever along said slot upon variations in the height of level of the liquid, the bottom of said cup member having a dial, a pointer carried by said lever and coöperating with said dial, a crystal secured to said flange and closing said aperture, and a packing for said crystal.

7. In a liquid gage, in combination, a slotted member adapted to be secured to the wall of a tank, a supporting member secured to said slotted member, a dial carried by said slotted member adjacent to said wall, a lever pivoted to said supporting member and having at one end a pointer projecting through said slot, a bell-crank lever pivoted to said supporting member and articulated to said first lever, and a float attached to the other arm of said bell-crank lever and adapted to actuate the same to move said pointer past said dial.

8. The combination, with a liquid containing tank, of a supporting member secured to the top wall thereof and extending downwardly therewithin, a lever pivoted to said supporting member, a second lever pivoted to said supporting member below said first lever and having one of its arms articulated to the end thereof by a pin and slot connection, the axes of said levers being parallel to each other, a float secured to the other arm of said second lever, and adapted to move said first lever upon changes in the level of liquid in said tank, a dial, and a pointer operatively connected to said first lever and coöperating with said dial.

9. The combination, with a tank having an aperture in its upper wall, of a slotted plate in said aperture and having a pair of brackets extending downwardly from its lower face, a lever pivoted between said brackets and having its upper end projecting through said slot, a float attached to the lower end of said bracket and adapted to move said lever along said slot upon changes in the level of liquid in the tank, a pointer carried by the upper end of said lever, a dial carried by said plate, and a transparent crystal secured above said pointer and closing said aperture.

10. The combination, with a tank, of a supporting member secured therewithin, a lever pivoted to said supporting member, a tube extending laterally from said tank, a fitting secured to the outer end of said tube and provided with a dial, a pointer coöperating with said dial, a connecting member extending through said tube and operatively connected with said lever and with said pointer, and a float operatively connected to said lever and adapted to move the same upon changes in the level of the liquid in said tank for moving said pointer with reference to said dial.

11. The combination, with a liquid containing tank, of a tube extending laterally therefrom, a fitting secured to the outer end of said tube and having an opening in its side, a crystal closing said opening, a slotted dial plate carried by said fitting, a pointer coöperating with said dial, a swinging lever pivoted within said tank, a connection between said lever and said pointer, said connection extending through said tube, a float in said tank, and means connecting said float and said lever whereby said lever will be swung about its axis upon changes in the level of liquid within said tank, and said pointer simultaneously moved with reference to said dial.

12. The combination, with a liquid containing tank having an aperture in one of its walls, of a cup shaped supporting member secured in said aperture and having a slot in its bottom and a perforation in its side wall, a tube secured to the wall of said tank and projecting outwardly, a fitting secured to the end of said tube and having a dial, a pointer coöperating with said dial, a lever pivoted within said tank and having its end projecting through said slot, a connecting member extending through said tube and perforation and operatively connecting said lever and said pointer, and a float operatively connected to said lever and adapted to move the end thereof along said slot upon changes in the level of the liquid in said tank.

13. The combination, with a liquid containing tank, of a lever pivoted therein, means for restricting the movement of said lever to a single plane, means for moving said lever within such plane upon changes in the level of liquid in said tank, a tube secured in the wall of said tank in the plane of such movement and extending outwardly, a fitting secured to the end of such tube and having a dial, a pointer coöperating with said dial, and a connecting member extending through said tube and operatively connecting said lever and said pointer.

14. The combination, with a liquid containing tank, of a tube secured in the wall of said tank and projecting outwardly therefrom, a fitting secured to the outer end of said tube and having an opening in its side, a transparent crystal closing said opening, a scale plate in said fitting, a pointer coöperating with said scale plate, a lever pivoted within said tank and having a float operatively connected thereto whereby said lever will be moved upon changes in the level of the liquid in the tank, a tracker operatively connected to said lever, and connections whereby relative movement will be produced between said pointer and said scale plate upon movement of said tracker caused by said lever.

15. The combination, with a liquid containing tank having an aperture in its wall, of a flange surrounding said aperture and defining an annular ledge, a cup shaped member having a circumferential rim or lip adapted to seat on said ledge, a gasket on said rim or lip, a crystal within said flange and seated on said gasket, and holding means for said crystal secured to said flange.

16. The combination, with a liquid containing tank having an aperture in its wall, of a flange surrounding said aperture and defining an annular ledge, a cup shaped member having a circumferential rim or lip adapted to seat on said ledge, said cup also having dial graduations on its bottom, an indicating member in said cup and coöperating with said graduations, a crystal in said flange outside of said cup, packing between said crystal and said cup lip, and crystal retaining means secured to said flange.

In testimony whereof, I hereunto affix my signature in the presence of two witnesses.

WILLIAM F. WARDEN.

Witnesses:
J. D. Palmer,
J. Asa Palmer.